Feb. 19, 1952

G. VILLEBONNET 2,586,748

REGULATION OF DIRECT CURRENT SOURCES
FOR THE SUPPLY OF ELECTRIC RECEIVERS

Filed Feb. 14, 1948

INVENTOR
Georges Villebonnet
BY John H Graham
HIS AGENT

Patented Feb. 19, 1952

2,586,748

UNITED STATES PATENT OFFICE 2,586,748

REGULATION OF DIRECT-CURRENT SOURCES FOR THE SUPPLY OF ELECTRIC RECEIVERS

Georges Villebonnet, Gentilly, France

Application February 14, 1948, Serial No. 8,378
In France November 24, 1942

4 Claims. (Cl. 323—15)

The present invention relates to new and useful apparatus for regulating the voltage supplied to electrically operated apparatus requiring substantially constant voltage, such as telecommunications for example, and which relies on sources of direct current.

In such installations, and particularly telecommunication systems, a usual source of current is from lead or cadmium-nickel accumulators or secondary batteries, and, as is well known, the voltage thereof is variable, whether the batteries are arranged in series, in parallel, and in buffer relationship or in trickle charge output. In such systems the voltage supply must be relatively constant, a tolerance plus or minus of only two volts being quite usual. Such voltage variations may be due to the loading conditions of the system or to variations in the voltage output of a particular cell in the source of supply, and are according to one known method corrected by addition or removal of further cells to the battery. According to another known method a commutator is employed to introduce resistance elements, for instance, in series with the battery to reduce the voltage. Alternatively elements having a counterelectromotive force, and operating as electrolytic resistances may be so inserted or removed. Such resistances or counter E. M. F. elements have many disadvantages. They are quite cumbersome; they give off gases resulting from electrolysis and require the same electric canalizations and the same care as the normal batteries in the circuit. Moreover, the switching elements for their insertion and removal have to be designed to take into account the presence of residual energy in the switching circuit.

It is the object of the present invention to provide a new and useful method and apparatus for accomplishing the desired voltage regulation in an installation of the type referred to in a simple manner and with great advantages over the prior art as hereinafter brought out.

The accompanying drawings forming part of this specification illustrate the present invention and the manner of its operation.

According to the present invention there are employed as resistance elements for effecting a desired voltage drop in series with the battery whose output voltage is to be stabilized a plurality of dry rectifier cells of known types such as selenium iron, copper, copper oxide, magnesium copper and the like. These cells possess in varying degree the well known property of offering to a current passed through them in their direction of greater conductivity a resistance varying directly (though not necessarily proportionally) with the current so passed. Their resistance is of course dependent upon other features such as the nature of the rectifier cell and the ambient temperature. In certain cases, the combined action of these various factors makes it possible, as is well known, to provide a dry contact cell, the voltage drop of which is practically constant when the cell is traversed in its preferred direction or direction of greater conductivity by a variable direct current. The connection of several such cells in series, in parallel, or in mixed grouping, permits providing a dry resistance element unit having the same useful electrical characteristics as the previously used resistance elements mentioned hereabove, with none of their disadvantages.

By connecting a group of such rectifier cells of selected characteristics in series with the source of direct current to be regulated, each cell being capable of causing a small voltage drop, such as several tenths of a volt, and by utilizing a number of cells which together can equal the voltage variation tolerance for the specific installation, a voltage regulator is provided having the characteristics of, firstly, progressive regulation, since the voltage drop in each cell element may well be of the order of a few tenths of a volt or more, and secondly, a great simplicity of the arrangement since the absence of residual energy permits the use of simple well known switches or commutators without any intermediate resistances being required.

For the same reason, it is possible to proceed directly to insert the cells into the circuit or to short-circuit them therefrom. The switches and relays, etc. which can be used for this purpose present a high factor of safety and may be provided with simple and well known contacts.

A third advantage of the invention is to reduce the bulk of the regulators required. By way of example, a dry rectifier unit comprising a group of magnesium-copper sulphide cells connected to a storage battery of 100 ampere-hour capacity at 24 volts requires a volume of less than a 10 centimeter cube.

Fourthly, no upkeep or maintenance is required since dry contact cells require no upkeep whatsoever and the use of such cells in the circuits of the invention has no influence on their usual length of life.

Figure 1:
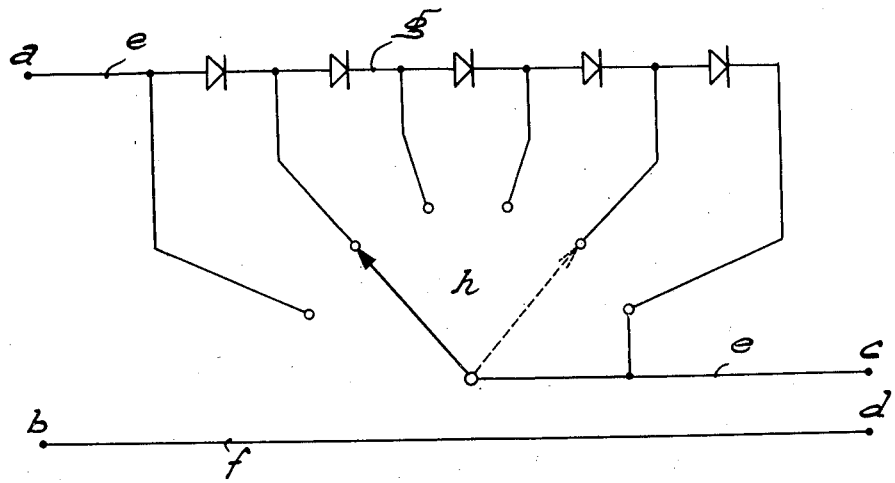
Figure 1 is a schematic diagram of a voltage regulator for a direct current power supply according to the invention employing manual control.

Referring now to the drawings, in the diagram illustrated in Fig. 1, $a$ and $b$ are the two input terminals of a source of direct current with variable voltage which may be a bank of batteries, while $c$ and $d$ are the two output terminals to which it is desired to apply a practically constant voltage, and which are connected to the terminals $a$ and $b$ by wires $e$, $f$.

Inserted in the wire $e$ there is provided a dry rectifier cell unit made up of a group of dry cells $g$ which in this example, are in series connection. The cells $g$ are connected, as shown, to the contacts of a commutator having a switch arm $h$, and the last cell is connected to the wire $e$. It will be seen from Fig. 1 that the cells to the left of the movable arm $h$ of the commutator will be inserted in the wire $e$, while those to the right are short-circuited, thus inserting in the circuit a desired number of cells $g$ to regulate the voltage at $c$ and $d$.

Figure 2:
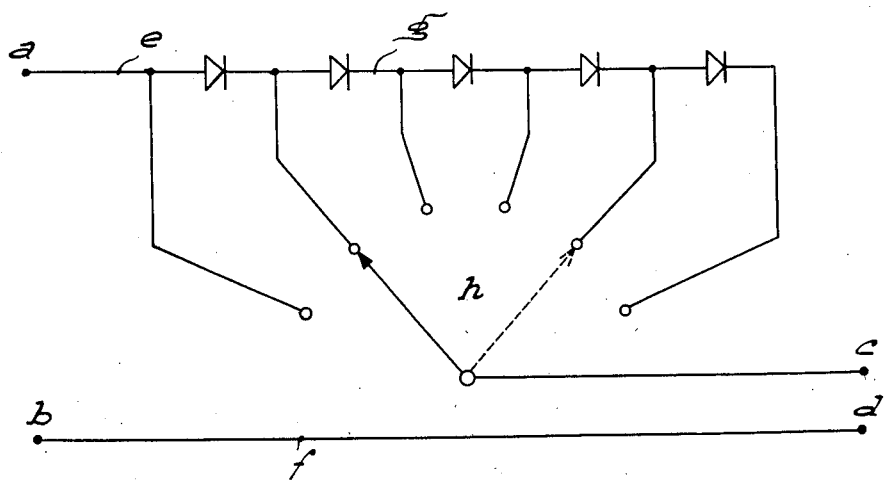
Figure 2 is a diagram of a modified regulator according to the invention, also using manual control.

Fig. 2 shows a diagram similar to that of Fig. 1 in which, however, the cells $g$ which are not connected actively into the circuit will not be short circuited. Again, however, any desired number of cells $g$ may be placed in the circuit at will.

Figure 3:
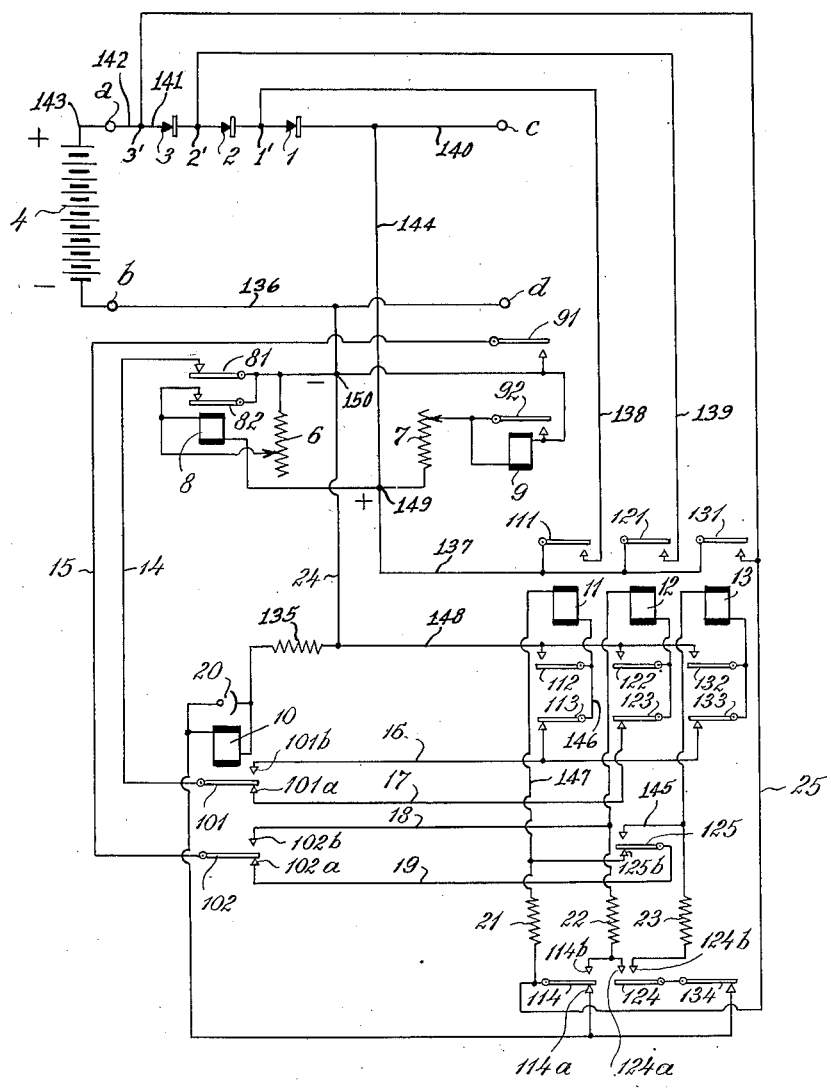
Figure 3 is a schematic diagram of a regulated battery-fed power supply according to the invention.

Fig. 3 illustrates voltage regulation by means of dry rectifier cells according to the invention in an automatically regulated power supply. In this embodiment of the invention, regulation of the voltage of a set of batteries shown as battery 4 is effected by automatically inserting one, two or three dry-contact cells 1, 2, 3, these being equivalent to cells $g$ (Fig. 1). This insertion of one of said cells is effected by opening a contact and its removal is effected by short-circuiting it. The contact being opened, the cell involved will be connected in series with the battery 4. The positive output terminal $c$ of the regulated supply is connected through line 140 with the entrance end of the voltage dropping unit comprising dry rectifier cells 1, 2, 3, poled to carry the current of battery 4 in their direction of greater conductivity. The exit end of this unit is connected through line 141, line 142, positive input terminal $a$ and line 143 to the positive terminal of battery 4. The negative terminal of the battery is connected to regulator input terminal $b$ and thence via line 136 to regulator output terminal $d$.

Automatic operation to insert or remove cells 1, 2 or 3 from the circuit in accordance with the voltage across the load terminals $c$, $d$ is ensured by means of a six-relay system comprising relays 8, 9, 10, 11, 12 and 13, all adapted to be energized by battery 4.

Relays 8 and 9 are connected with their associated resistances 6 and 7 in parallel across the terminals $c$, $d$ whereby they will be fed with the corrected or regulated voltage. To this end, supply terminal $c$ is connected through wire 144 to junction 149 terminal while the other supply terminal $b$ is connected to the junction 150 through wire 136. The coils or windings of both relays 8 and 9 are connected, in series with variable resistors 6 and 7, between junctions 149 and 150.

In contradistinction thereto, relays 10, 11, 12 and 13 are connected across the battery 4 and are energized with its non-corrected or unregulated voltage.

The two relays 8 and 9 are of the minimum and maximum threshold types respectively and are so connected as to receive the voltage variations across supply terminals $c$, $d$ and to transform these variations into impulses directed by the switching relay 10 to the short circuiting relays 11, 12 and 13 which control the short-circuiting and reinsertion of the cells 1, 2 and 3.

Relay 8 is of the minimum threshold type, i. e. it will de-energize when the voltage applied to its winding falls below a specified minimum. The threshold value thereof, in terms of supply voltage at $c$, $d$ may be adjusted by the rheostat 6 connected in series with the coil of relay 8. When relay 8 becomes de-energized upon decline of the supply voltage below the minimum set at rheostat 6, relay 8 relaxes its armature, allowing its normally closed contacts 81 and 82 to close. When 82 closes, rheostat 6 is short-circuited, the current through the winding is increased and the relay attracts its armature again, reopening contacts 81 and 82. If during the de-energization of relay 8 the supply voltage has not risen above the lower level of the regulated voltage range set at rheostat 6, relay 8 will immediately de-energize again, allowing its contacts to close. At each closing of contact 81, a negative impulse is sent via line 14 to contact blade 101 of switching relay 10. Thus relay 8 will continue to "beat", i. e. to open and close, until the minimum supply voltage is reached at terminals $c$, $d$.

Relay 9 is of the maximum threshold type, i. e. it will energize when the voltage applied to its winding increases above the specified maximum. The upper limit of regulated supply voltage at $c$, $d$ corresponding to this maximum may be adjusted by means of rheostat 7. When the supply voltage rises above the maximum so set, relay 9 will be energized, attracting its armature and closing its normally open contacts 91 and 92. Upon closing of 92, the relay winding is short-circuited, and the contacts reopen. At each closing, 91 sends a negative impulse via line 15 to switch blade 102 of switching relay 10. If upon reopening its contacts, relay 9 again experiences a voltage above its threshold, it will close its contacts once more, and so on, until the supply voltage falls to a value within the range of regulation.

The switching relay 10 is provided with two contact blades 101 and 102 each having two contacts, 101a, 101b, and 102a, 102b, respectively. Contact blade 101 is adapted to transmit from connecting wire 14 the control impulses resulting from the operation of relay 8. Contact blade 102 is arranged to transmit from connecting wire 15 the control impulses resulting from the operation of relay 9.

The position of relay 10 and its contact blades 101 and 102 is controlled by the condition of the short-circuiting relays 11, 12 and 13, which are connected in cascade. Relay 10 will be energized when an even number of short-circuiting relays are energized (i. e., none or the first two) and it will remain in its deenergized condition if an odd number of short circuiting relays are energized (i. e., the first or all three of them). The energizing winding of relay 10 is mounted in series with contact blade 114 of relay 11 (via normally closed contact 114a), with blade 134 of relay 13 and with blade 124 of relay 12 (via blade 134).

Relay 10 is therefore de-energized if relay 11 only is energized (contact 114a being open) or if relays 11, 12 and 13 are simultaneously energized (contact 134 being opened). Similarly relay 10 is energized if relays 11, 12 and 13 are de-energized (114a being closed) or if 11 and 12 are energized (134, 124a and 114b being closed).

Relay 10 is of the slow-acting type due to the presence of a condenser 20 connected across its energizing winding. Thus, when a change in supply voltage is created by inserting an element 1, 2 or 3 or by short-circuiting one of them, this is accompanied, in fact is caused by, a corresponding change in the number of energized short-circuiting relays. However, due to the aforesaid condenser 20, the alteration in position of relay 10 resulting therefrom will take place only after a time lag during which additional negative pulses from relays 8 and 9 are inoperative.

Each of the relays 11, 12 and 13 is provided to close or open a short-circuiting contact 111, 121 or 131 in the chain of dry rectifier cells 1, 2 or 3. These relays are connected in cascade so that no one of them can be energized unless the preceding relay is already energized. To this end, the winding of relay 11 is connected via a resistor 21 and line 35 to the positive termnial of the battery 4 while the winding of relay 12 is connected thereto through resistor 22 by means of normally open contact 114b and plate 114 of relay 11. The winding of relay 13 is connected to the positive terminal of the battery through resistor 23 via normally open contacts 124b and 124a of relay 12 and 114b of relay 11. Similarly, none of the relays 11, 12 and 13 can be brought into its de-energized position so long as any of the following is still energized. Moreover, the relay 11 will provide to short-circuit the first cell 1 while the relay 12 will short-circuit two cells 1 and 2 and the relay 6 will short-circuit three cells 1, 2 and 3. This result is achieved in a very simple manner. Positive terminal c of the power supply is connected to each relay by wires 140, 144 and 137. Junctions 1', 2' and 3' in the series connection of rectifier cells are respectively connected through wires 138, 139 and 25 to the contacts 111, 121 and 131. When, for instance, the relay 12 is set to operate, contact 121 will short-circuit simultaneously the cells 1 and 2 through the medium of wires 137 and 139. Similarly, contact 131 of relay 13 will short-circuit the three elements 1, 2 and 3 while the contact 111 will only short-circuit the element 1.

For a clearer understanding of the manner in which the apparatus according to this invention operates, it is helpful to consider a particular case. The selected example may be as follows: the voltage becomes lower than a predetermined lower limit while all three elements 1, 2 and 3 are actually in operation in the circuit.

With all of the cells 1, 2 and 3 in the circuit, i. e. non short circuited, relay 8 is energized (due to the assumed fall in power supply output voltage below the lower limit of the regulated range) and its contacts 81 and 82 are open. On the other hand relay 9 is de-energized, and its contacts 91 and 92 are also open.

Initially also, the three cells 1, 2 and 3 being in the circuit, the contacts 111, 121 and 131 are open and the three relays 11, 12 and 13 are de-energized. Therefore, the switching relay 10 is energized, and its contact 101 is in position to connect wires 14 and 16.

Under the conditions assumed, if the supply voltage at c, d becomes lower than the preselected value, it is necessary to short-circuit from the circuit one or more of the elements 1, 2 and 3. When the supply voltage falls below the preselected value, relay 8 de-energizes, and its contacts 81 and 82 thus close. The negative supply terminal d connected by wires 136 and 24 with contact 81 is then connected with the positive terminal a of the battery through wires 14, 16 (since, with all of relays 11, 12 and 13 de-energized, switching relay 10 is energized to connect switch blades 101 and 102 with normally open contacts 101b and 102b, respectively), normally closed energizing contact 113, wire 146, winding of relay 11, wire 147, resistor 21, and wire 25. This will energize relay 11, closing its normally open holding contact 112 and opening its energizing contact 113. Instead of being energized through contact 113 relay 11 will then be energized through contact 112 and wires 24 and 148 to the negative terminal of the battery, connection to the positive battery terminal being via wire 147, resistor 121 and wire 25 as before.

As the winding of relay 11 is now permanently energized regardless of negative pulses from wire 16, it will hold contact 111 closed, and the cell 1 will be short-circuited.

Short circuiting of cell 1 will produce an increase of the supply voltage at c, d. If with this increase the voltage at c, d returns to a value between the predetermined upper and lower limits, relay 8 will return to a steady energized condition with its contacts open. Relay 29 of course will remain de-energized with its contacts open.

If in spite of the short circuiting of a cell, the supply voltage at c, d remains below the permissible minimum, the next impulse from contact 81 (occurring upon reclosing of contact 81 when relay 8 again relaxes its armature due to insufficient energizing voltage) will be directed toward relay 12 via wire 17, since relay 10 relaxes its armature upon energization of relay 11. With contact blade 114 closed at normally open contact 114b by the prior energization of relay 11, relay 12 is permitted to be energized, shorting out rectifier cell 2. Relay 20 is then reenergized so that the next negative pulse from contact 81 will energize relay 13, again via wire 16.

When the power supply voltage at the output terminals c and d changes in the reverse direction, i. e. rises above the upper limit of the regulated range, and with relay 11 only assumed to have been energized, for example, the operation is as follows: upon increase of the voltage at c, d above the maximum, relay 9 will be energized, and its contacts 91 and 92 will close. The negative supply terminal d is then connected to junction 150 and thence via closed contact 91, wire 15, contacts 102, 102a, wire 19 and contacts 125, 125b to wire 147 and the winding of relay 11. At the same time the other end of the winding of relay 11 is connected to the negative supply voltage through contact 112 and wires 148 and 24. Due to the presence of resistor 21, the positive voltage on wire 25 is isolated, and the winding of relay 11 is short-circuited. Normally open contact 112 thereupon opens. The de-energization of relays 12 and 13 is similarly effected with the assistance of resistors 22 and 23, respectively.

What I claim is:

1. A regulated direct current power supply comprising a battery, a plurality of dry contact rectifiers connected in series with the battery and poled to pass in their direction of greater conductivity a current forced through them by the battery, and means responsive to the voltage across the series connection of battery and rectifiers to short-circuit said rectifiers successively as said voltage falls below a minimum value and to reinsert said rectifiers successively in series with the battery as said voltage rises above a maximum value.

2. A regulated direct current power supply comprising a battery, a plurality of dry contact rectifying elements connected in series with the battery and poled to pass in their direction of low resistance a current forced through them by the battery upon completion of a circuit including the battery and rectifying elements, a plurality of short-circuiting relays, one for each of said elements, a normally open contact on each of said relays connected to short-circuit when closed one of said elements, a minimum and a maximum voltage relay each having its winding connected in series with a resistance across the combination of battery and rectifying elements in series, and a switching relay controlled by the state of energization of the short-circuiting relays to direct energizing pulses from the minimum voltage relay and de-energizing pulses from the maximum voltage relay to the windings of the short-circuiting relays in a specified order.

3. A voltage regulator for a source of direct current voltage comprising a pair of input terminals for connection to said source, a pair of output terminals for connection to a load, a plurality of dry contact rectifying elements connected in series between one of said input and one of said output terminals and poled to pass in their direction of low resistance a current forced through them by the source upon completion of a circuit including the source and rectifying elements, a plurality of short-circuiting relays, one for each of said elements, a normally open contact on each of said relays connected to short-circuit when closed one of said elements, a minimum and a maximum voltage relay each having its winding connected in series with a resistance across said output terminals, a first normally closed contact on said minimum voltage relay connected to short-circuit when closed the resistance in series with its winding, a second normally closed contact on said relay connecting when closed one of said input terminals to a first contact blade of a switching relay, a first normally open contact on said maximum voltage relay connected to short-circuit when closed the winding of its relay, a second normally open contact on said maximum voltage relay connecting when closed the same input terminal to a second blade of said switching relay, a switching relay having its winding connected across said input terminals via a normally closed switch relay controlling contact on a first one of the short-circuiting relays and also via a normally closed switch relay controlling contact on a third of the short-circuiting relays and one of two normally open switch relay controlling contacts on the second short-circuiting relay and a normally open switch relay controlling contact on the first short-circuiting relay, a normally closed energizing and a normally open holding contact on each of the short-circuiting relays connecting with their respective windings, a normally open and a normally closed short-circuiting relay energizing contact on the switching relay associated with said first contact blade connecting the second normally closed contact on the minimum voltage relay to the energizing contacts of the short-circuiting relays in a specified order, and a normally open and a normally closed de-energizing contact on the switching relay associated with the second contact blade thereof connecting the second normally open contact of the maximum voltage relay to the ends of the short-circuiting relay windings opposite their energizing contacts in the reverse order.

4. A voltage regulator for a source of direct current voltage comprising a pair of input terminals for connection to said source, a pair of output terminals for connection to a load, a plurality of dry contact rectifying elements connected in series between one of said input and one of said output terminals and poled to pass in their direction of low resistance a current forced through them by the source upon completion of a circuit including the source and rectifying elements, a plurality of short-circuiting relays, one for each of said elements, a normally open contact on each of said relays connected to short-circuit when closed one of said elements, a minimum and a maximum voltage relay each having its winding connected in series with a resistance across said output terminals, a first normally closed contact on said minimum voltage relay connected to short-circuit when closed the resistance in series with its winding, a second normally closed contact on said minimum voltage relay connecting when closed one of said input terminals to a first contact blade of a switching relay, a first normally open contact on said maximum voltage relay connected to short-circuit when closed the winding of its relay, a second normally open contact on said maximum voltage relay connecting when closed the same input terminal to a second blade of said switching relay, a switching relay having its winding connected across said input terminals via a normally closed switch relay controlling contact on a first one of the short-circuiting relays and also via a normally closed switch relay controlling contact on a third of the short-circuiting relays and one of two normally open switch relay controlling contacts on the second short-circuiting relay and a normally open switch relay controlling contact on the first short-circuiting relay, a normally closed energizing and a normally open holding contact on each of the short-circuiting relays connecting with their respective windings, a connection from a normally open contact of the switching relay associated with its first contact blade to the energizing contacts of the first and third short-circuiting relays, a connection from a normally closed contact associated with the first contact blade of the switching relay to the energizing contact of the second short-circuiting relay, a connection from a normally open contact associated with the second contact blade of the switching relay to the end of the winding of the second short-circuiting relay remote from its energizing contact and to the normally open switch relay controlling contact on the first short-circuiting relay and to one of the normally open switch relay controlling contacts on the second short-circuiting relay, a connection from a normally closed contact associated with the second blade of the switching relay leading via a further normally closed contact on the second short-circuiting relay to the end of the winding of the first short-circuiting relay remote from its energizing contact and via a further normally open contact on the second short-circuiting relay to the corresponding end of the winding of the third short-circuiting relay and to the second normally open switch relay controlling contact on the second short-circuiting relay.

GEORGES VILLEBONNET.

REFERENCES CITED

The following references are of record in the file of this patent:

UNITED STATES PATENTS

| Number | Name | Date |
|---|---|---|
| 969,583 | White | Sept. 6, 1910 |
| 1,186,618 | Tatum | June 13, 1916 |
| 1,438,945 | Conway | Dec. 19, 1922 |
| 1,598,694 | Shackleton | Sept. 7, 1926 |
| 1,696,415 | Roberts | Dec. 25, 1928 |
| 1,741,375 | Niles et al. | Dec. 31, 1929 |
| 1,824,194 | Brooks | Sept. 22, 1931 |
| 1,838,961 | Robinson | Dec. 29, 1931 |
| 1,883,613 | Devol | Oct. 18, 1932 |
| 1,957,479 | Timmons | May 8, 1934 |

FOREIGN PATENTS

| Number | Country | Date |
|---|---|---|
| 427,430 | Great Britain | Apr. 24, 1935 |